(No Model.) 3 Sheets—Sheet 1.

T. O'BRIEN.
TRICYCLE.

No. 347,503. Patented Aug. 17, 1886.

Witnesses:
J. Staib
Chas. H. Smith

Inventor:
Thomas O'Brien
per Lemuel W. Serrell
Atty (No Model.) 3 Sheets—Sheet 3.

T. O'BRIEN.
TRICYCLE.

No. 347,503. Patented Aug. 17, 1886.

Fig. 3

Witnesses:
J. Staib
Chas. H. Smith

Inventor
Thomas O'Brien
per Lemuel W. Serrell
atty

UNITED STATES PATENT OFFICE.

THOMAS O'BRIEN, OF NEW YORK, N. Y.

TRICYCLE.

SPECIFICATION forming part of Letters Patent No. 347,503, dated August 17, 1886.

Application filed March 19, 1886. Serial No. 195,790. (No model.)

*To all whom it may concern:*

Be it known that I, THOMAS O'BRIEN, of the city and State of New York, have invented an Improvement in Tricycles, of which the following is a specification.

This invention in some particulars is a modification of that shown in my Patent No. 287,566, granted October 30, 1883.

In my present improvement I provide several seats, that may be occupied by different persons, and two or more of such persons may act in propelling the vehicle, and, when desired, portions of the propelling apparatus can be disconnected to relieve any one of the persons upon the tricycle from exerting a propelling force.

Figure 1:
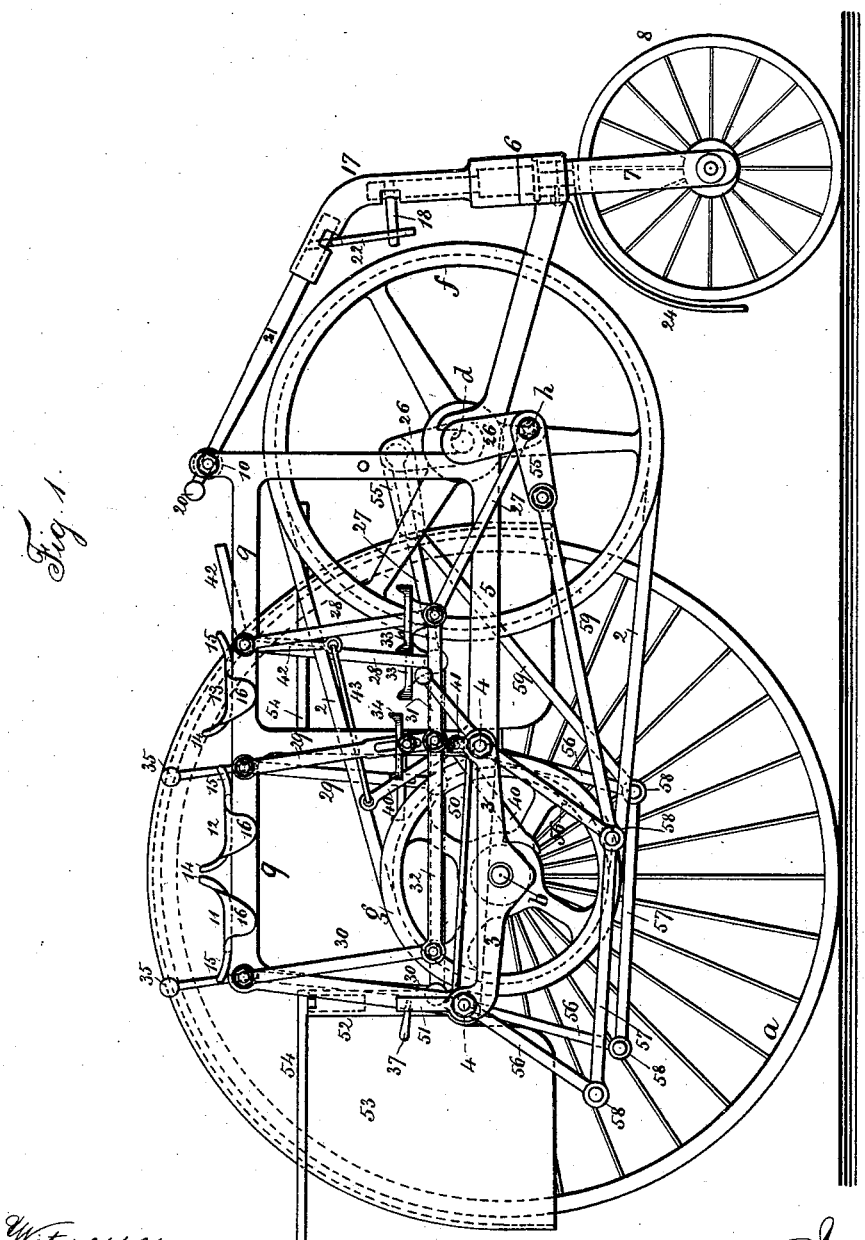
Figure 2:
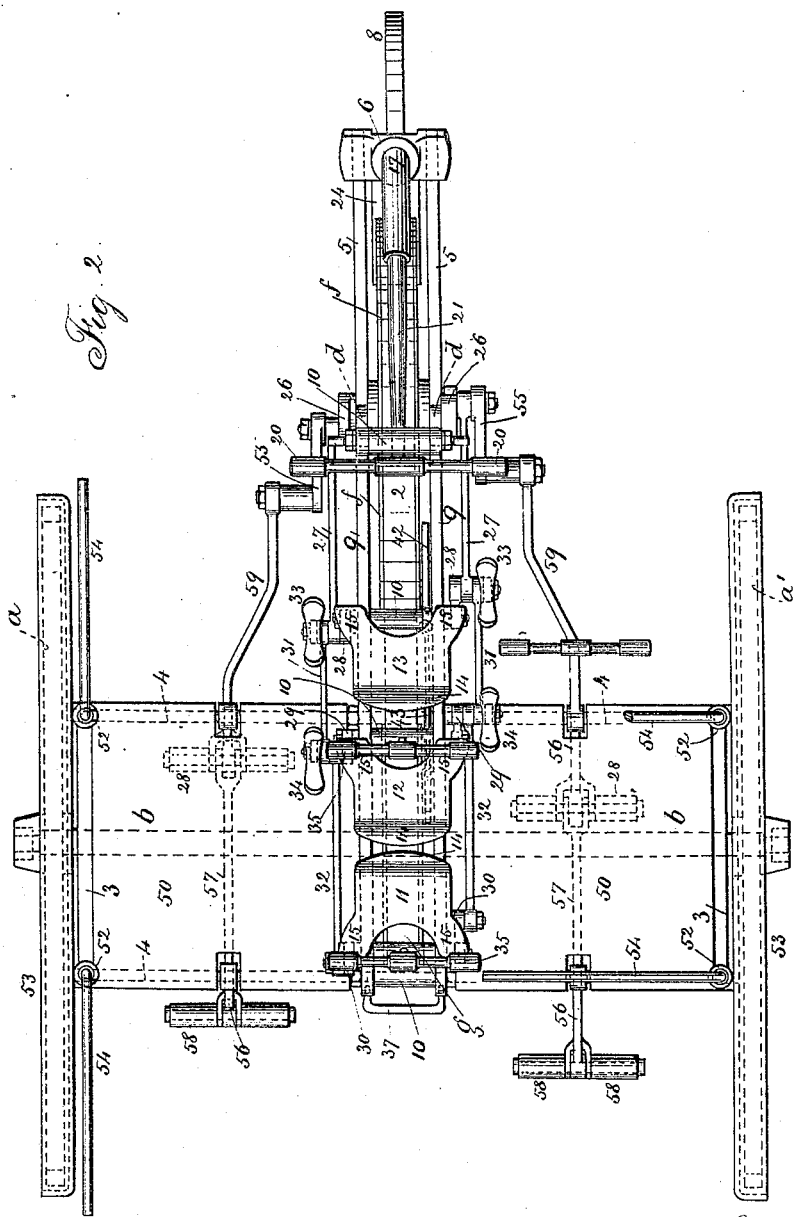

In the drawings, Figure 1 is an elevation with the driving-wheel at one side removed. Fig. 2 is a plan view, and Fig. 3 is a rear elevation, of the machine.

The driving-wheels $a$ $a'$ are upon an axle, $b$, to which the power is applied from a belt or chain, 2, around the wheel $g$ on the axle $b$, and the wheel $f$ upon the crank-axle $d$, to which the propelling power is applied, and to this extent my present machine corresponds to that in the aforesaid patent, and I remark that there may be springs applied between the frame of the machine and the axle $b$, and also both wheels $a$ and $a'$ may be fastened to the axle $b$, or one of said wheels may be loose upon the axle.

The frame of the machine is composed of the bearers 3, that rest upon the axle $b$, and there are bars 4 parallel with said axle and uniting the bearers 3, and also passing through the center frames, 5, which frames 5 extend forward and form the bearings for the crank-shaft $d$, and also receive and support the socket 6, through which passes the vertical pivot of the fork 7, that receives the steering-wheel 8.

The center frames, 5, also extend upwardly to the saddle-bars 9, and these are held at the proper distances apart by cross-bolts 10, and upon these bars 9 are the saddles 11 12 13. These saddles are of a suitable shape for the riders to sit upon. They are provided with the back plates, 14, and the shields 15 at the front ends, upon which the legs rest while the person moves the lower joints of the limbs in propelling the vehicle. The shields 15 prevent the clothing coming into contact with the joints of the radius-bars, hereinafter mentioned. Each saddle is provided with clip-pieces 16, that pass down at the outer sides of the saddle-bars 9, to hold the saddles in place, and also to allow for the saddles being placed farther forward or backward, to accommodate the riders.

Upon the upper part of the socket 6 is a tubular elbow, 17, which is slotted upon the side next to the wheel $f$, and the pivot-bar of the jaw 7 extends up into this tubular elbow 17 and receives the projecting arm 18, that passes out through the lower slot in the tubular elbow 17. The handles 20 are upon the steering-bar 21, which passes through one of the cross-bolts 10, and into the upper end of the tubular elbow 17, and there is a downwardly-projecting arm, 22, that is attached to the steering-bar and projects through the upper slot in the tubular elbow 17 and receives the projecting arm 18, so that when the handles 20 and steering-bars 21 are moved the steering-wheel is turned through the slotted arm 22 and projecting arm 18. This enables the party seated upon the forward saddle, 13, to steer the tricycle. If desired, the ends of the arms 18 and 22 may be made with interlocking bevel gear-teeth, so as to be in the form of toothed sectors. It is preferable to employ the guard 24 upon the fork 7, extending backwardly over the steering-wheel 8, to prevent mud or water being splashed upon the belt 2.

The crank-shaft $d$ has upon it the cranks 26, which are preferably at one hundred and eighty degrees apart, and there are connecting-rods 27, extending backwardly to the radius-bars 28, that are pivoted at their upper ends to the saddle-bars 9, and there are pairs of radius-bars 29 and 30; also pivoted at their upper ends to the saddle-bars 9, and connected together at their lower ends and to the radius-bars 28 by the links 31 and 32. Upon these radius-bars and links are the foot pieces or treadles 33 34, to which the feet of the riders occupying the saddles 12 and 13 are applied, so as to give motion, through the connecting-rods, to the cranks 26, band-wheels $f$ and $g$, belt 2, and driving-wheels. It is preferable to make use of short shafts between the upper ends of the radius-bars 29 and 30, said short shafts passing across through the saddle-bars 9, and also forming the pivots upon which the radius-bars swing, and each shaft is connected at one end to one of the radius-bars, and through these cross-bars holes are made that receive the central bars of the cross handles 35. These cross-handles serve to steady the riders upon the saddles 11 and 12, and also to allow hand-power to be exerted in swinging the radius-bars and propelling the vehicle.

It will be apparent that the rider upon the saddle 11 rides backwardly and sits back to back with the person upon the saddle 12, and his feet may rest upon treadles upon the links 32, or they may be placed upon the stationary rests 37 and the cross-handle 35 only made use of.

The brake-lever 40 is pivoted at 41 and acted upon by the lever 42 and link 43, the end of the brake-lever resting against the wheel $g$, or against the shaft $b$, and this brake-lever is acted upon by the rider that occupies the saddle 13.

Extending across between the bars 4 there are seats 50, and the distances between the center frame, 5, and the wheels $a$ $a'$ are to be sufficient for a person to sit upon such seats 50, and these seats may be wide enough from front to back for two persons to sit back to back.

At the ends of the beams 3 there are vertical studs 51, that receive upon them the tubular sockets 52 of the shields 53. These shields or guards are of suitable material and sufficiently large to inclose the upper halves of the driving-wheels $a$ $a'$, and the flanged edges of the shields project out over the driving-wheels, so as to prevent injury by contact with the edges of the wheels.

The sockets 52 project above the upper ends of the studs 51, and receive into them the vertical portions of the hand-bars 54. These hand-bars drop into notches in the upper ends of the tubular sockets 52 at the time such hand-bars occupy a position parallel to the axis $b$, the object of these hand-bars being to guard the persons riding upon the seats 50, as they project out in front of such persons; but the said hand-bars can be lifted and swung around against the inner sides of the shields 53 when the persons are getting on or off of the seats 50.

It is often desirable to make use of power from the feet or hands, or both, of the persons riding upon the seats 50. With this object in view the secondary crank 55 and crank-pins are fastened permanently to the crank-pins $h$, so that the pins of the cranks 55 are about ninety degrees distant from the pins of the cranks $h$ and from the bars 4. The radius-bars 56 hang down and are connected by the rods 57, and the treadle-pieces 58 project from the joint-pins at the lower ends of the radius-bars 56, and from the forward radius-bars to the cranks 55 the connecting-rods 59 extend, so that persons sitting on the seats 50 can act upon the treadle-pieces 58 with their feet, and through the connecting-rods and crank aid in propelling the driving-wheel $f$.

There may be a cross-bar handle at the upper end of each of the pendent links 56, to allow the front riders upon the seats 50 to grasp such cross-handles and apply hand-power in addition to the foot-power.

By disconnecting the rods 59 from the treadles 58 and applying a cross-head to the end of each connecting-rod the cranks 55 may be acted upon by hand, or the connections to the cranks 55 may be entirely removed, or the connecting-rods 59 may be disconnected from 58 and connected at the lower ends of the radius-bars 29, the links 31 being removed, so that the persons on the seats 11 and 12 may apply power to the secondary cranks 55.

I claim as my invention—

1. The combination, with the driving-wheels $a$ $a'$ and steering-wheel 8, of the frames that connect the respective wheels together, the saddle-bars at the upper portions of the frames and the saddles upon the same, the tubular elbow 17, the handle 20, steering-bar 21, slotted arm 22, and arm 18, projecting from the pivot of the steering-wheel, the tubular elbow being slotted for the passage of the respective arms, substantially as set forth.

2. The combination, with the driving-wheels $a$ $a'$, shaft $b$, driving-pulleys $g$ and $f$, of the shaft $d$, having cranks at the outer ends, and secondary cranks and crank-pins at ninety degrees from the crank-pins of the shaft $d$, and connecting-rods 27 and 59, the radius-bars and connections, the saddle-bar and saddles, the seats 50, and the respective foot pieces or treadles, substantially as set forth.

3. The combination, with the driving-wheels, steering-wheel, and the frames connecting the respective parts, of the wheels $f$ and $g$, band or chain 2, shaft $d$, and cranks, the radius-bars hanging from the saddle-frames, the saddles resting upon the saddle-bars, and the treadles or foot-pieces and connecting-rods, substantially as set forth.

4. The combination, with the driving-wheels and the chain or band wheels $f$ $g$ and the chain or band 2, of the crank-shaft and cranks, saddle-bars and saddles, radius-bars and treadles or foot-pieces, and a cross-handle bar above the saddle and connected with the radius-bars, for applying hand-power, in addition to the foot-power, to the main cranks of the machine, substantially as set forth.

5. The combination, with the driving-wheels and the steering-wheels, of frames to connect the respective parts, the seats 50 at each side of the central frames and over the axle of the driving-wheels, and the guards at the inner sides of the driving-wheels $a$ $a'$, substantially as set forth.

6. The driving-wheels, shaft, and frames, in combination with the seats 50, over the axle $b$, the removable guards and the studs, and sockets for supporting the same, and the hand-bars resting in notches in the upper ends of the tubular sockets, substantially as set forth.

7. The combination, with the driving-wheels, axle, and supporting-frames, of the wheels $f$ and $g$, and belt or chain, and the compound cranks at the ends of the shaft of the wheel $f$, and the seat 50, and connection 59, treadles 58, and radius-bar 56, for revolving the cranks and wheels, substantially as set forth.

8. The combination, with the driving-wheels $a\ a'$, steering-wheel, and the chain or band wheels $f\ g$, and chain or band, of the compound cranks upon the shaft $d$ of the wheel $f$, and the connecting rods and treadles, and the swinging radius-bars and the saddles and saddle-bar, and the connections between the saddle-bar and radius-bars, substantially as set forth.

Signed by me this 16th day of March, A. D. 1886.

THOMAS O'BRIEN.

Witnesses:
GEO. T. PINCKNEY,
WILLIAM G. MOTT.